Aug. 15, 1939.　　　S. W. LONG　　　2,169,264
BUSHING
Filed July 2, 1938　　3 Sheets-Sheet 1
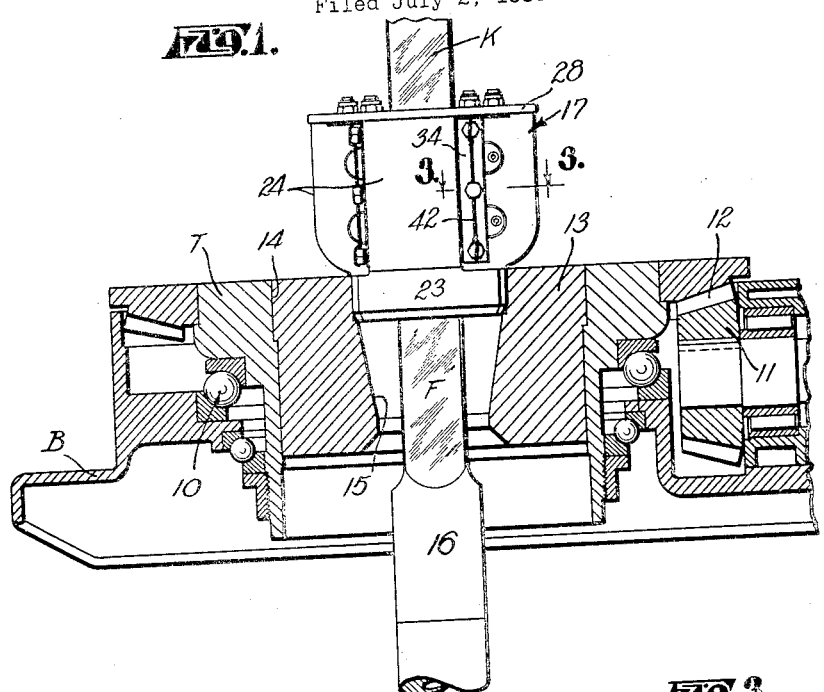
Inventor
SPENCER W. LONG
By
His Attorney Aug. 15, 1939.   S. W. LONG   2,169,264
BUSHING
Filed July 2, 1938   3 Sheets-Sheet 2

Inventor
Spencer W Long
By
His Attorney

Aug. 15, 1939.    S. W. LONG    2,169,264
BUSHING
Filed July 2, 1938    3 Sheets-Sheet 3

Inventor
SPENCER W. LONG
By W. Allafell
His Attorney

Patented Aug. 15, 1939

2,169,264

UNITED STATES PATENT OFFICE 2,169,264

BUSHING

Spencer W. Long, Inglewood, Calif., assignor to Baash-Ross Tool Company, Los Angeles, Calif., a corporation of California Application July 2, 1938, Serial No. 217,271

9 Claims. (Cl. 255—23)

This invention relates to well drilling equipment and relates more particularly to drive bushings or kelly bushings for use in the rotary tables of well drilling rigs. A general object of this invention is to provide a simple, sturdy and very durable drive bushing or kelly bushing.

Another object of this invention is to provide a kelly bushing embodying pluralities or series of rotatable kelly-contacting rollers mounted in an integral or one-piece bushing body of simple construction.

Another object of this invention is to provide a kelly bushing of the character mentioned in which the pins carrying the rollers are of large diameter and are supported by body walls or parts of substantial thickness to dependably support the kelly engaging rollers.

Another object of this invention is to provide a kelly bushing of the character mentioned embodying independent or individual lubricating means for each roller to permit the positive lubrication of the several rollers and their respective supporting pins.

Another object of this invention is to provide a kelly bushing of the character mentioned in which the rollers and their pins are of substantial length and are arranged so that the rollers extend beyond the corners of the polygonal kelly to provide for an advantageous distribution of the forces or loads on the supporting pins.

Another object of this invention is to provide a kelly bushing of the character mentioned in which the rollers and their pins are easily and quickly assembled in the body at the rotary table with the kelly extending through the body.

Another object of this invention is to provide novel means for holding or locking the roller supporting pins of a kelly bushing against rotation and longitudinal movement.

A further object of this invention is to provide a roller type kelly bushing of the character mentioned that is simple and inexpensive to manufacture.

Figure 5:
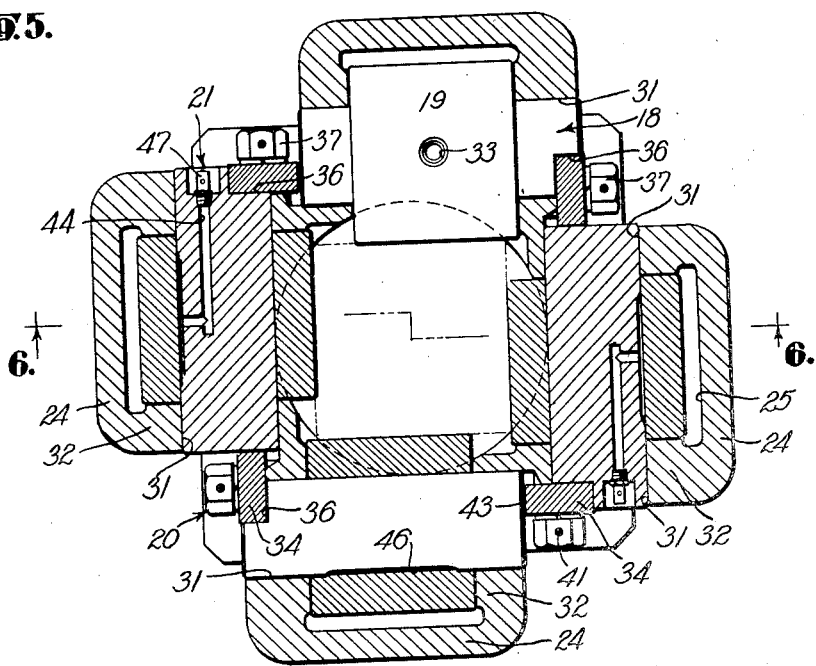
Figure 6:
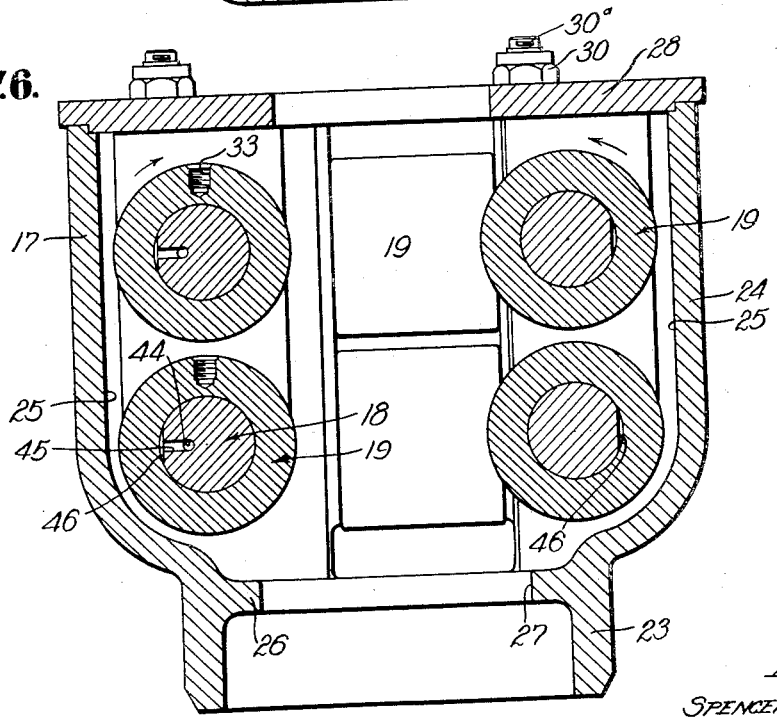
Figure 7:
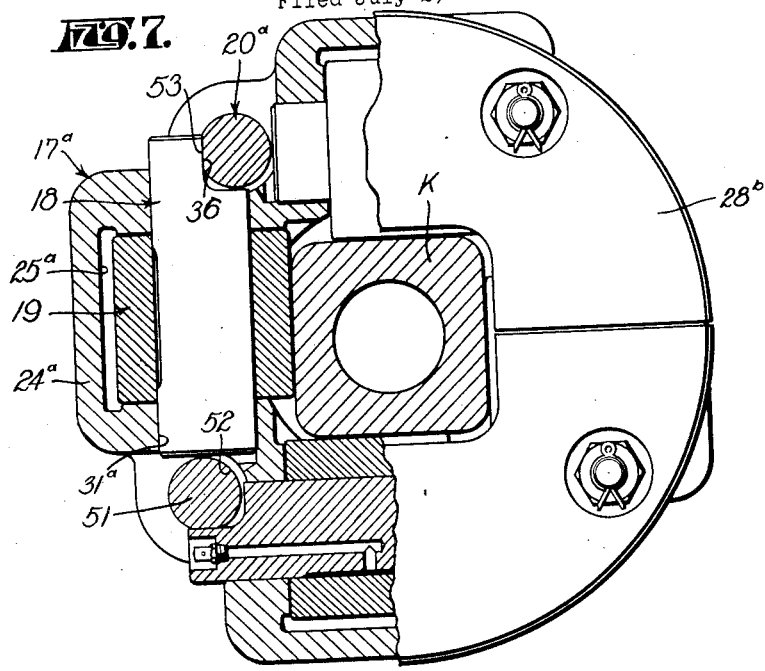
Figure 8:
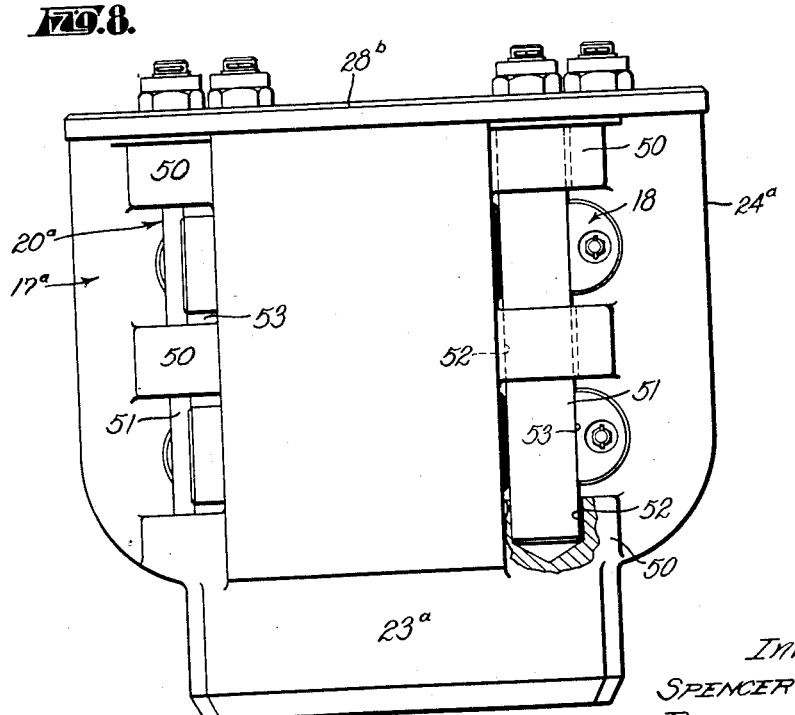

The various objects and features of my invention will be fully understood from the following detailed description of typical preferred forms and applications of the invention, throughout which description reference is made to the accompanying drawings, in which:

Fig. 1 is a side elevation of the improved kelly bushing of the present invention arranged in a typical rotary table and engaging about a kelly, showing the rotary table in vertical cross section. Fig. 2 is an enlarged top or plan view of the bushing. Fig. 3 is an enlarged fragmentary horizontal detailed sectional view taken as indicated by line 3—3 on Fig. 1. Fig. 4 is an enlarged fragmentary vertical detailed sectional view taken as indicated by line 4—4 on Fig. 2. Fig. 5 is an enlarged horizontal detailed sectional view of the bushing showing the kelly in broken lines. Fig. 6 is an enlarged vertical detailed sectional view taken substantially as indicated by line 6—6 on Fig. 5. Fig. 7 is a top view of another form of the invention with a portion broken away to appear in horizontal cross section, and Fig. 8 is a side elevation of the bushing illustrated in Fig. 7.

The bushing of the present invention is intended for use in a rotary table of a well drilling rig to rotate or drive the well drilling string. The invention may be embodied in bushings for use in rotary tables of different types and constructions and for engaging or driving drill stems or kellies of different shapes, etc. In the following detailed disclosure I will describe two typical forms of the invention for use in a typical rotary table to drive a kelly of substantially square cross section. It is to be understood that the invention is not to be construed as limited or restricted to the specific forms or applications about to be described but is to be taken as including any features or modifications that may fall within the scope of the claims.

The rotary table T illustrated in Fig. 1 of the drawings is rotatably supported on a base B by suitable bearings 10. The table T is driven or rotated by a gear 11 meshing with teeth 12 on the under side of the table. A master bushing 13 is seated in the central opening 14 of the table T to rotate with the table. The master bushing 13 has a central vertical opening 15 whose upper portion is polygonal or square and whose major portion tapers downwardly and inwardly. I have shown a kelly K extending vertically through the table and its bushings. The kelly K is an elongate member whose major portion is polygonal having four flat faces F. The end portions 16 of the elongate kelly K are enlarged or externally upset in accordance with the usual practice.

The improved kelly bushing of the present invention shown in Figs. 1 to 6, inclusive, may be said to comprise, generally, a body 17 for arrangement in the master bushing 13, a plurality of supporting pins 18 in the body 17, rollers 19 rotatably carried by the pins 18 to transmit the turning forces to the kelly faces F, means 20 for holding the supporting pins 18 against movement and displacement and means 21 for lubricating the rollers 19 and their pins 18.

The body 17 is provided to support and contain the rollers 19 and their pins 18. It is a feature of the invention that the body 17 is an integral part or member of sturdy design. The body 17 is shaped and proportioned to extend into or fit in the opening 15 of the master bushing 13. The lower end portion 23 of the body 17 is substantially square to fit the square upper portion of the opening 15 so that the kelly bushing rotates with the bushing 13 and the table T. The bushing body 17 is of substantial length or height and projects upwardly beyond the upper surface of the master bushing 13. The projecting major upper portion of the bushing body 17 is generally cross-shaped in horizontal cross section, having four spaced vertically extending ribs 24. The ribs 24 have flat parallel sides and their outer surfaces may be perpendicular thereto. The lower ends of the ribs 24 curve or round downwardly and inwardly to join the square lower portion 23 of the body 17. The central vertical planes of the ribs 24 are offset forwardly from the diametric planes of the bushing body 17 relative to the right-hand direction of rotation for a purpose which will later become evident.

The body 17 is tubular or hollow to pass the kelly K and each rib 24 has an internal or inwardly facing recess 25 for containing a pair or set of rollers 19. The recesses 25 are of substantial length and extend downwardly from the upper ends of the ribs 24. The opposite side walls of the recesses 25 may be flat and vertical and the outer sides of the recesses may be closed. An annular inwardly projecting shelf or flange 26 is provided on the interior of the body 17 at the lower ends of the recesses 25. The central vertical opening 27 in the annular flange 26 is of sufficient diameter to pass the upset portions 16 of the kelly K with suitable clearance.

A split annular cover plate 28 is arranged on the upper end of the busing body 17. The plate 28 rests on the upper ends of the body ribs 24 and closes the upper ends of the recesses 25. Studs 29 project from the upper ends of the ribs 24 and nuts 30 are threaded on the studs 29 to retain the cover plate 28 in place. The nuts 30 are preferably of a self-locking type and may be positively held against displacement by cotter keys 30ª. The cover plate 28 is split to be readily assembled around the kelly and has a square central opening 28ª freely passing the kelly K. The opening 28ª in the cover plate 28 is proportioned so that the cover plate is adapted to be engaged by the upper upset end portion (not shown) of the kelly K when lowering the kelly in the rat hole to protect or save the upper rollers 19 against the imposition of the weight of the kelly and the swivel (not shown). As will be subsequently described, the top plate 28 is arranged on the bushing body 17 following the assembly of the rollers 19 and the pins 18 in the bushing.

The supporting pins 18 are provided to rotatably carry or support the rollers 19. The pins 18 may be simple cylindrical members and may be identical or substantially alike, as illustrated. The roller supporting pins 18 are carried by the body ribs 24 and pass horizontally or transversely through their recesses 25. In the preferred construction there are two vertically spaced sets or pairs of horizontally aligned openings 31 in each body rib 24 to carry the pins 18. The openings 31 intersect the recesses 25 and the pins 18 have their opposite end portions supported in the openings 31. It is to be observed that the side walls 32 of the body ribs 24 are of substantial thickness to dependably support the opposite end portions of the pins 18. In accordance with the invention the pins 18 are of substantial diameter to be strong and to provide maximum wearing surfaces. The pins 18 are proportioned so that their opposite ends are accessible at the outer side surfaces of the body ribs 24. The pins 18 are assembled in the body 17 subsequent to the arrangement of their respective rollers 19 in the recesses 25 and are held in place by the means 20, as will be hereinafter described. The body 17 is shaped so that the pins 18 may be easily and conveniently inserted in place. As best illustrated in Fig. 5 of the drawings, the pins 18 may be easily inserted in their respective openings 31 from the exposed and fully accessible sides of the body ribs 24.

The rollers 19 are carried by the supporting pins 18 to engage the flat faces F of the kelly K to transmit the turning forces to the kelly. The rollers 19 are cylindrical tubular members having flat opposite ends. In the preferred construction a roller 19 is directly rotatably supported on each pin 18. The flat opposite ends of the rollers 19 have suitable working clearance with the internal surfaces of the rib walls 32 and these surfaces serve to limit endwise movement of the rollers. It is a feature of the invention that the rollers 19 are of substantial length and of substantial diameter. The recesses 25 in the body ribs 24 are large to receive the large rollers 19. The rollers 19 are arranged and proportioned to project inwardly from the recesses 25 to contact the faces F of the kelly K. The long rollers 19 have extensive engagement with the large diametered supporting pins 18. The rollers 19 in each body recess 25 are spaced one above the other to be independently rotatable.

The relationship between the rollers 19 and the faces F of the kelly K is important. As best illustrated in Fig. 5 of the drawings, the rollers 19 extend across substantially the entire width of the kelly faces F and extend or project beyond the advancing corners of the kelly K with respect to the right-hand direction of rotation. During normal drilling operations the heavy turning forces are transmitted from the rollers 19 to the forward portions of the faces F with respect to the right-hand direction of rotation. The long rollers 19 extending beyond the forward corners of the faces F are effective in the transmission of these forces. Due to the disposition of the rollers 19 relative to the vertical center of the bushing and owing to the length of the rollers 19 there is an extensive distribution of the forces or loads transmitted between the rollers 19 and their supporting pins 18. The portions of the rollers 19 extending beyond the forward corner of the kelly K have their interiors bearing on the pins 18 for the better distribution of the heavy loads. The large diametered supporting pins 18 dependably support the rollers 19 without danger of bending or breaking. The pins 18 and the rollers 19 being of large size may be readily case hardened to be long wearing. Each roller 19 is provided with a threaded socket 33 to facilitate its assembly in the body 17 as will be hereinafter described.

The means 20 for holding or locking the supporting pins 18 against movement and displacement are simple and positive. There is a holding means 20 provided for each set or pair of vertically aligned pins 18. Each means 20 includes a holding bar 34. One wall 32 of each body rib 24 has a vertically extending external groove 35. The grooves 35 are preferably provided in the inner parts of the rib walls 32 and join or extend across portions of the openings 31 in the rib walls 32. In practice the grooves 35 are of substantial length and extend from the upper ends of the ribs 24 to beyond the lower openings 31. Each roller supporting pin 18 has a transverse notch 36 in one end registering with a groove 35. The bars 34 are arranged in the grooves 35 to extend through and cooperate with the notches 36. The outer sides of the bars 34 are substantially flush with the external surfaces of the rib walls 32 and the adjacent ends of the pins 18. Cap screws 37 are passed through transverse openings 38 in the bars 34 and are threaded in sockets 39 in the rib walls 32. Lock washers or spring washers 40 may be arranged under the heads of the screws 37. It will be apparent how the screws 37 secure the bars 34 in place.

Openings 41 are provided in the heads of the screws 37 and wires 42 are passed through the openings 41 of the screw heads at each bar 34 to further lock the screws 37 against unthreading. The bars 34 cooperating with the flat walled notches 36 in the ends of the pins 18 serve to positively hold the pins against turning and against longitudinal movement in one direction. The bars 34 are located so each have an edge 43 adjacent or in engagement with the ends of the pins 18 carried by an adjacent body rib 24. These surfaces or edges 43 serve to limit or prevent endwise movement of the pins 18 in the other direction. Thus the bars 34 serve to secure the supporting pins 18 against turning and against longitudinal shifting in both directions. It is to be observed that the bars 34 and their securing screws 37 are readily accessible at the sides of the body ribs 24.

The means 21 for lubricating the rollers 19 are such that each roller and its supporting pin 18 may be individually serviced or lubricated. The supporting pins 18 arranged as described above have their ends freely accessible at the sides of the body ribs 24. Each lubricating means 21 includes a longitudinal lubricant passage 44 entering an end of a supporting pin 18. The passages 44 preferably enter the ends of the pins 18 having the notches 36 and are spaced from the notches to be clear of the bars 34 and their screws 37. The passages 44 extend inwardly to or beyond the medial transverse planes of the rollers 19. The lubricating means 21 further include transverse ports 45 extending outwardly from the passages 44 to the peripheries of the supporting pins 18. The ports 45 are preferably horizontal and are located substantially midway between the ends of the rollers 19.

Lubricant chambers are formed or provided in the rollers 19 to receive lubricant from the ports 45. These lubricant chambers are formed or provided by making substantially flat faces 46 on the pins 18 at the outer ends of the ports 45. The faces 46 extend longitudinally of the pins 18 and have their ends spaced inwardly short distances from the adjacent ends of the rollers 19. The substantially flat surfaces or faces 46 are preferably tangent to circles concentric with the longitudinal axes of the pins 18. Grease gun fittings 47 are provided at the outer ends of the lubricant passages 44 to facilitate the introduction of lubricant under pressure to the passages.

Lubricant forced into the passages 44 flows out through the ports 45 to the faces 46 and is thus supplied to the bearing surfaces of the pins 18 and the rollers 19. Lubricant in the chambers at the faces 46 is drawn and wiped upwardly by or on the internal surfaces of the rollers 19 as the rollers turn in the direction indicated by the arrows in Fig. 6, during the downward feeding of the kelly K. The lubricant is wiped and drawn downwardly on the internal surfaces of the rollers 19 when the rollers turn in the other direction. It is to be observed that the lubricant fittings 47 on the several supporting pins 18 are easily accessible at the ends of the pins to workmen at the table T.

In assembling the bushing of the present invention the kelly K may be threaded or passed through the bushing body 17 prior to the assembly of the rollers 19 in the body. The opening 27 in the body flange 26 is proportioned to pass or admit the upset portion 16 on the entering end of the kelly K. Following the threading of the kelly K through the body 17 the rollers 19 are individually assembled in the bushing body. In assembling a lower roller 19 a lifting bar (not shown) is threaded in its socket 33 and the roller is lowered in a recess 25 by means of the lifting bar. The roller is lowered to a position in alignment with a lower pair of openings 31 and a supporting pin 18 is passed through the openings and the tubular roller. The upper rollers 19 are assembled in a similar manner. When the several pins 18 and rollers 19 have been assembled the bars 34 are arranged in the grooves 35 to cooperate with the notches 36 and are secured in place by the screws 37. The screws 37 are then locked against unthreading by the wires 42. The cover plate 28 is then assembled about the kelly K and secured to the upper end of the bushing body 17 by the nuts 30. If desired or necessary the rollers 19 may be lubricated by forcing lubricant under pressure through the fittings 47. The bushing is then in condition for operation.

With the bushing body 17 seated in the opening 15 of the master bushing 13 the bushing is adapted to transmit rotation to the kelly K when the table T is rotated. The long large-diametered rollers 19 cooperate with the faces F of the kelly K for the transmission of this rotation to the kelly. The rollers 19 being freely rotatable allow the kelly K to be fed vertically as it is rotated. The large rollers 19 bearing on the large-diametered pins 18 are long wearing and are dependably supported by the long-wearing pins. The rollers 19 and their supporting pins 18 have large-diametered cooperating surfaces for the effective distribution of the loads and to promote long wear. The individual rollers 19 and their pins 18 may be easily lubricated from time to time. The grease gun fittings 47 on the several pins 18 are easily accessible to provide for this lubrication. The bars 34 positively hold the pins 18 against turning and against axial shifting in both directions.

Figs. 7 and 8 of the drawings illustrate the improved bushing of the present invention provided with another form or type of pin locking means 20ª. The bushing illustrated in Figs. 7 and 8 comprises, generally, a body 17ª, supporting pins 18, rollers 19 carried by the pins 18 to contact the kelly K and the means 20ª for locking or holding the pins 18 against movement. The pins 18 and the driving rollers 19 may be identical with those described above and the pins and rollers may be lubricated by lubricating means 21 as above-described. The rollers 19 and their supporting pins 18 are related and are mounted as in the previously described form of the invention.

The body 17ª is very similar to the body 17 illustrated in Figs. 1 to 6, inclusive, but may be slightly different in its external configuration. The body 17ª has a lower portion 23ª to fit the square portion of the master bushing opening 15. Vertically extending ribs 24ª are provided on the body 17ª and the ribs 24ª have recesses 25ª for receiving the rollers 19. A cover plate 28ᵇ similar to or identical with the cover plate 28 is provided on the upper end of the body 17ª.

In accordance with this form of the invention vertically spaced horizontally projecting lugs 50 are provided in the corners of the body 17ª occurring between the pairs of adjacent ribs 24ª. The lugs 50 are preferably integral parts of the body 17ª and are in the nature of connecting webs extending between the vertical sides of adjacent ribs 24ª. In the preferred construction there are three lugs 50 between each adjacent pair of ribs 24ª, one lug 50 of each set being adjacent the upper end of the body 17ª, one lug 50 being adjacent the lower ends of the ribs 24ª, and one lug 50 being spaced between the pin carrying openings 31ª in the ribs. The lugs 50 are proportioned and positioned so that the roller supporting pins 18 may be readily inserted in their openings 31ª from the sides of the body ribs 24ª.

The means 20ª are provided to hold or lock the roller supporting pins 19 against both longitudinal and rotary movement. Each means 20ª includes a locking pin or holding pin 51. Vertical openings 52 are provided in the body lugs 50 to receive the pins 51. The openings 52 in each set of lugs 50 are in vertical alignment so that the pins 51 may be passed downwardly into them from the upper end of the bushing. The openings 52 in the lowermost lugs 50 are in the nature of sockets being closed at their lower ends and the pins 51 are adapted to engage the lower ends of the socket-like openings to be held against downward movement thereby. The holding pins 51 are proportioned so that their upper ends are at the lower side of the cover plate 28ᵇ and the plate thus serves to limit or prevent upward movement of the pins. Each pin 51 has a flat longitudinally extending surface 53.

The parts are related and proportioned so that each pin 51 passes through the notches 36ª of one set or pair of adjacent pins 18 and has its periphery or external surface at or engaging the plain ends of the other adjacent pair of pins 18. Thus each holding pin 51 serves to prevent turning and longitudinal movement in one direction of one adjacent pair of pins 18 and to prevent longitudinal movement of the other adjacent pair of pins in the other direction. The pins 18 are proportioned to extend beyond the sides of the ribs 24ª and to have notches 36ª of substantial size to receive the pins 51. The flat surfaces 53 of the pins 51 preferably cooperate with the longitudinal or axial walls of the notches 36ª as illustrated in the drawings.

It is believed that it will be apparent how the pins 51 arranged as described above serve to positively prevent turning of the pins 18 and longitudinal movement of the pins 18 in both directions. It is to be noted that the holding pins 51 may be easily arranged in place subsequent to the assembling of the pins 18 and the rollers 19 and prior to the arrangement of the cover plate 28ᵇ on the body 17ª. The cover plate 28ᵇ serves to hold the pins 51 against movement and displacement and no other securing means are required to hold the pins 51 in place.

Having described only typical preferred forms and applications of my invention, I do not wish to be limited or restricted to the specific details herein set forth, but wish to reserve to myself any variations or modifications that may appear to those skilled in the art or fall within the scope of the following claims.

Having described my invention, I claim:

1. A rotary table bushing for driving a polygonal stem comprising a body having an opening for passing the stem and provided with spaced vertical ribs, each rib having a recess extending downwardly from its upper end and opening inwardly to said opening and having aligned transverse openings, pins carried in said transverse openings to pass through the recesses, rollers rotatable on the pins in the recesses and projecting into the body opening to contact the stem, there being a notch in an end of each pin, and bars attached to the sides of the ribs and cooperating with the notches to hold the pins against movement.

2. A rotary table bushing for driving a drill stem comprising a body for arrangement in the table and having an opening passing the stem, the body including spaced external ribs each provided with a recess extending downwardly from its upper end and joining the opening and vertically spaced horizontal openings intersecting the recess, the recesses being closed at the opposite sides and outer faces of the ribs, rollers passed downwardly into the recesses from their upper ends, pins passed into the horizontal openings from the sides of the ribs to rotatably support the rollers in position to contact the stem, and means on said sides of the ribs engaging the pins to hold the same against movement.

3. A rotary table bushing for driving a drill stem comprising a body for arrangement in the table and having an opening passing the stem, spaced vertical recesses extending downwardly from its upper end and joining the opening and a series of vertically spaced horizontal openings intersecting each recess, rollers passed downwardly into the recesses from their upper ends, pins passed into the horizontal openings from the exteriors of the body to support the rollers for rotation in position to contact the stem, and bar members detachably secured to the exterior of the body and cooperating with the pins at the ends of the horizontal openings to hold the pins in place.

4. A rotary table bushing for driving a drill stem comprising a body for arrangement in the table and having an opening passing the stem, the body including spaced external ribs each provided with a recess extending downwardly from its upper end and joining the opening and vertically spaced horizontal openings intersecting the recess, rollers passed downwardly into the recesses from their upper ends, pins passed into the horizontal openings from the sides of the ribs to support the rollers for rotation in position to contact the stem, there being a notch in an end of each pin, and a member attached to a side of each rib to cooperate with the notches in the pins carried by its respective rib to hold said pins against turning and longitudinal movement in one direction, the member on one rib being engageable by the pins carried by an adjacent rib to hold the last named pins against longitudinal movement in the other direction.

5. A rotary table bushing for driving a drill stem comprising a body for arrangement in the table and having an opening passing the stem, the body including spaced external ribs each provided with a recess extending downwardly from its upper end and joining the opening and vertically spaced horizontal openings intersecting the recess, rollers passed downwardly into the recesses from their upper ends, pins passed into the horizontal openings from the sides of the ribs to support the rollers for rotation in position to contact the stem, there being a notch in an end of each pin, and a groove in a side of each rib registering with the notches in the pins carried by the rib, and bars in the grooves cooperating with the notches to hold the pins against turning and longitudinal movement in one direction, the bars being positioned to be engageable by the pins carried by adjacent ribs to prevent endwise movement of the same in the other direction.

6. A rotary table bushing for driving a drill stem comprising a body for arrangement in the table and having an opening passing the stem, the body including spaced external ribs each provided with a recess extending downwardly from its upper end and joining the opening and vertically spaced horizontal openings intersecting the recess, rollers passed downwardly into the recesses from their upper ends, pins passed into the horizontal openings from the sides of the ribs to support the rollers for rotation in position to contact the stem, there being a notch in an end of each pin and a groove in a side of each rig registering with the notches in the pins carried by the rib, bars in the groove cooperating with the notches to hold the pins against turning and longitudinal movement in one direction, the bars being positioned to be engageable by the pins carried by adjacent ribs to prevent endwise movement of the same in the other direction, screws attaching each bar to the body, and wires securing together the screws to prevent unthreading of the same.

7. A rotary table bushing for driving a drill stem comprising a body for arrangement in the table and having an opening passing the stem, the body including spaced external ribs each provided with a recess extending downwardly from its upper end and joining the opening and vertically spaced horizontal openings intersecting the recess, rollers passed downwardly into the recesses from their upper ends, pins passed into the horizontal openings from the sides of the ribs to support the rollers for rotation in position to contact the stem, vertically spaced lugs on the body between each pair of adjacent ribs having openings, and members carried in the openings of the lugs holding the pins against movement.

8. A rotary table bushing for driving a drill stem comprising a body for arrangement in the table and having an opening passing the stem, the body including spaced external ribs each provided with a recess extending downwardly from its upper end and joining the opening and vertically spaced horizontal openings intersecting the recess, rollers passed downwardly into the recesses from their upper ends, pins passed into the horizontal openings from the sides of the ribs to support the rollers for rotation in position to contact the stem, spaced lugs on the body between each pair of adjacent ribs, said lugs having vertical openings, members inserted in said vertical openings and holding the pins against movement, and a cover plate on the body preventing displacement of said members.

9. A rotary table bushng for driving a drill stem comprising a body for arrangement in the table and having an opening passing the stem, the body including spaced external ribs each provided with a recess extending downwardly from its upper end and joining the opening and vertically spaced horizontal openings intersecting the recess, rollers passed downwardly into the recesses from their upper ends, pins passed into the horizontal openings from the sides of the ribs to support the rollers for rotation in position to contact the stem, there being a notch in an end of each pin, vertically spaced parts on the body between each pair of adjacent ribs having vertical openings, locking pins arranged in the vertical openings and cooperating with the notches and ends of the adjacent roller-supporting pins to hold the said pins against movement, and a cover plate on the body preventing loss of the locking pins.

SPENCER W. LONG.